United States Patent
Blackburn et al.

(10) Patent No.: US 11,787,697 B2
(45) Date of Patent: Oct. 17, 2023

(54) COMPOSITIONS HAVING REDUCED THERMAL CONDUCTIVITIES AND METHODS OF MAKING THE SAME

(71) Applicants: Alliance for Sustainable Energy, LLC, Golden, CO (US); The University of Denver, Denver, CO (US)

(72) Inventors: Jeffrey Lee Blackburn, Golden, CO (US); Andrew John Ferguson, Louisville, CO (US); Barry Lee Zink, Denver, CO (US)

(73) Assignees: Alliance for Sustainable Energy, LLC, Golden, CO (US); University of Denver, Denver, CO (US)

( * ) Notice: Subject to any disclaimer, the term of this patent is extended or adjusted under 35 U.S.C. 154(b) by 7 days.

(21) Appl. No.: 17/474,409

(22) Filed: Sep. 14, 2021

(65) Prior Publication Data
US 2022/0081297 A1   Mar. 17, 2022

Related U.S. Application Data (60) Provisional application No. 63/077,853, filed on Sep. 14, 2020.

(51) Int. Cl.
*C01B 32/168* (2017.01)
*C01B 32/162* (2017.01)
*B01J 23/882* (2006.01)

(52) U.S. Cl.
CPC .......... *C01B 32/168* (2017.08); *B01J 23/882* (2013.01); *C01B 32/162* (2017.08); *C01P 2002/52* (2013.01); *C01P 2004/13* (2013.01)

(58) Field of Classification Search
CPC ... C01B 32/168; C01B 32/162; C01B 32/159; C01B 32/158; C01B 32/16; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26;
(Continued)

(56) References Cited

U.S. PATENT DOCUMENTS

2018/0194629 A1\*   7/2018   Avery ................... G01N 23/20

OTHER PUBLICATIONS

Avery, et al., Tailored semiconducting carbon nanotube networks with enhanced thermoelectric properties, Nature Energy 2016; 1: 1-9 (Year: 2016).\*

(Continued)

*Primary Examiner* — Daniel C. McCracken
(74) *Attorney, Agent, or Firm* — Michael A. McIntyre (57) ABSTRACT

The present disclosure relates to a composition that includes a film having a network of randomly aligned carbon nanotubes, where the carbon nanotubes have an average diameter between about 0.6 nm and about 2.0 nm and the carbon nanotubes form bundles having an average diameter between about 3 nm and about 50 nm. In addition, the composition is characterized by a power factor $\alpha^2\sigma$ between 1 $\mu W/mK^2$ and about 3500 $\mu W/mK^2$ and by $ZT=\alpha^2\sigma T/k$ between about 0.02 and about 2.0 over a temperature range between about 100 K and about 500 K.

11 Claims, 5 Drawing Sheets

(58) Field of Classification Search
CPC ............ C01B 2202/28; C01B 2202/30; C01B 2202/32; C01B 2202/34; C01B 2202/36; B01J 23/882; C01P 2002/52; C01P 2004/13; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

OTHER PUBLICATIONS

Yudasaka, et al., Diameter Enlargement of HiPco Single-Wall Carbon Nanotubes by Heat Treatment, Nano Letters 2001; 1(9): 487-489 (Year: 2001).*

Lepak, et al., CNT fibers p-doped with F4TCNQ (2,3,5,6-Tetrafluoro-7,7,8,8-tetracyanoquinodimethane), Proc. of SPIE 2017 vol. 104454S-1 to 10445S-7 (Year: 2017).*

Salazar-Rios, et al., Customizing the Polarity of Single-Walled Carbon-Nanotube Field-Effect Transistors Using Solution Based Additives, Adv. Electron. Mater. 2020; 6: 1900789, pp. 1-9 (published online Nov. 29, 2019) (Year: 2019).*

Agrawal, K.V. et al., "Observation of extreme phase transition temperatures of water confined inside isolated carbon Tanotubes," Nature Nanotechnology, vol. 12, Mar. 2017, 8 pages.

Avery, A.D. et al., "Thermal and electrical conductivity of approximately 100-nm permalloy, Ni, Co, A1, and Cu films and examination of the Wiedemann-Franz Law," Physical Review B, vol. 92, 2015, 10 apges.

Avery, A.D. et al., "Tailored semiconducting carbon nanotube networks with enhanced thermoelectric properties," Nature Energy, vol. 1, Apr. 2016, 9 pages.

Blackburn, J.L. et al., "Carbon-Nanotube-Based Thermoelectric Materials and Devices," Advanced Materials, vol. 30, 2018, 35 pages.

Blackburn, J.L. et al., "Intrinsic and Extrinsically Limited Thermoelectric Transport within Semiconducting Single-Walled Carbon Nanotube Networks," vol. 5, 2019, 10 pages.

Chalopin, Y. et al., "Upper bound to the thermal conductivity of carbon nanotube pellets," Journal of Applied Physics, vol. 105, 2009, 5 pages.

Dresselhaus and Eklund, "Phonons in carbon nanotubes," Advances in Physics, vol. 49, No. 6, 2000, DOI: 10.1080/000187300413184; 111 pages.

Hung, N.T. et al., "Thermoelectric Properties of Carbon Nanotubes," Energies, vol. 12, 2019, 27 pages.

Kodama, T. et al., "Modulation of thermal and thermoelectric transport in individual carbon nanotubes by fullerene encapsulation," Nature Materials, vol. 16, Sep. 2017, 7 pages.

MacLeod, B.A. et al., "Large n- and p-type thermoelectric power factors from doped semiconducting single-walled carbon nanotube thin films," Energy & Environmental Science, vol. 10, 2017, 12 pages.

Mason, S.J. et al., "Determining absolute Seebeck coefficients from relative thermopower measurements of thin films and nanostructures," Journal of Applied Physica, vol. 127, 2020, 10 pages.

Norton-Baker, B. et al., "Polymer-Free Carbon Nanotube Thermoelectrics with Improved Charge Carrier Transport and Power Factor," ACS Energy Letters, vol. 1, 2016, 9 pages.

Prasher, R.S. et al., "Turning Carbon Nanotubes from Exceptional Heat Conductors into Insulators," Physical Review Letters, vol. 102, 2009, 4 pages.

Sultan, R. et al., "Thermal conductivity of micromachined low-stress silicon-nitride beams from 77 to 325 K," Journal of Applied Physics, vol. 105, 2009, 7 pages.

Sultan, R. et al., "Heat transport by long mean free path vibrations in amorphous silicon nitride near room temperature," Physical Review B, vol. 87, 2013, 9 pages.

Volkov, A.N. et al., "Head conduction in carbon nanotube materials: Strong effect of intrinsic thermal conductivity of carbon nanotubes," Applied Physics Letters, vol. 101, 2012, 5 pages.

* cited by examiner

COMPOSITIONS HAVING REDUCED THERMAL CONDUCTIVITIES AND METHODS OF MAKING THE SAME

CROSS-REFERENCE TO RELATED APPLICATIONS

This application claims priority from U.S. Provisional Patent Application No. 63/077,853 filed on Sep. 14, 2020, the contents of which are incorporated herein by reference in their entirety.

CONTRACTUAL ORIGIN

This invention was made with government support under Contract No. DE-AC36-08G028308 awarded by the Department of Energy. The government has certain rights in the invention.

SUMMARY

An aspect of the present disclosure is a composition that includes a film having a network of randomly aligned carbon nanotubes, where the carbon nanotubes have an average diameter between about 0.6 nm and about 2.0 nm, the carbon nanotubes form bundles having an average diameter between about 3 nm and about 50 nm. In addition, the composition is characterized by a power factor $\alpha^2\sigma$ between 1 $\mu W/mK^2$ and about 3500 $\mu W/mK^2$ and by $ZT=\alpha^2\sigma T/k$ between about 0.02 and about 2.0 over a temperature range between about 100 K and about 500 K. $\alpha$ is the Seebeck coefficient, a is the electrical conductivity, k is the thermal conductivity, and T is temperature.

In some embodiments of the present disclosure, the carbon nanotubes may include single-walled carbon nanotubes. In some embodiments of the present disclosure, the composition may further include a dopant that is a strongly reducing molecule or a strongly oxidizing molecule. In some embodiments of the present disclosure, the dopant may include at least one of $Cl_6Sb$, $F_4$-TCNQ, and/or a dodecaborane cluster. In some embodiments of the present disclosure, the composition may further include a solvent. In some embodiments of the present disclosure, the solvent may include at least one of an alkane, an aromatic, a conjugated solvent, and/or a halogenated hydrocarbon. In some embodiments of the present disclosure, the alkane may include at least one of hexane, dodecane, hexadecane, and/or cis-decalin. In some embodiments of the present disclosure, the aromatic or conjugated solvents may include at least one of toluene, chlorobenzene, and/or 1,2-dichlorobenzene. In some embodiments of the present disclosure, the halogenated hydrocarbon may include at least one of 1,1-dichloromethane, chloroform, and/or 1,2-dichloroethane.

In some embodiments of the present disclosure, at least one of the dopant and/or the solvent may have a freezing point temperature in a temperature range between about 100 K and about 400 K. In some embodiments of the present disclosure, at least a portion of at least one of the solvent and/or the dopant may be positioned within the carbon nanotubes. In some embodiments of the present disclosure, the film may have a thickness between about 20 nm and 200 µm. In some embodiments of the present disclosure, the composition may include a density of junctions between orthogonally aligned carbon nanotubes or carbon nanotube bundles, as measured by atomic force microscopy.

An aspect of the present disclosure is a method that includes immersing carbon nanotubes in a mixture of a solvent and a dopant and treating the carbon nanotubes with at least one of a solvent and/or a mild acid, where the treating removes a polymer from a surface of the carbon nanotubes. In some embodiments of the present disclosure, the carbon nanotubes may be synthesized by a method that includes at least one of a high-pressure disproportionation of carbon monoxide method, a catalytic chemical vapor deposition method using a cobalt-molybdenum catalyst method, a plasma torch method, an arc discharge method, and/or a laser vaporization method.

BRIEF DESCRIPTION OF DRAWINGS

Some embodiments are illustrated in referenced figures of the drawings. It is intended that the embodiments and figures disclosed herein are to be considered illustrative rather than limiting.

FIG. 2 illustrates elements according to some embodiments of the present disclosure: a) Simple thermal model and schematic of the thermal isolation platform used to characterize CNT thermoelectric films. b) Scanning electron micrographs of a platform with a CNT network film. Heaters, thermometers, and leads used to measure k, a, and a are visible, and described in main text. c-e) Higher magnification views of the CNT film demonstrate the morphology of the tube bundles forming the network film. c) shows the edge of the masked region, where the film is not fully dense. d) and e) show the dense middle of the sample in two magnifications. f) $K_B$ vs. T for one platform before deposition of the film (red line) and after the addition of the HiPCO network demonstrates the small contribution of this film and the low k. Inset Optical image shows the full view of the micromachined Si—N platform. g-i) comparison of approximate size of a tube bundle, SWCNT, and the OA acid molecule and resulting $Cl_6Sb$ dopant, respectively. Panel i) also indicates the bundle diameter d, tube diameter $d_t$, and several possible locations for dopant molecules within the bundle and/or CNT.

REFERENCE NUMERALS

100 . . . composition
110 . . . film
120 . . . bundle of carbon nanotubes
130 . . . carbon nanotubes
140 . . . dopant
150 . . . solvent

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to thermoelectric materials. The thermal conductivity of a thermoelectric material is one of the key material-level properties that determine the dimensionless thermoelectric figure-of-merit. Thermal conductivity has two components due to phonon transport and charge-carrier transport. In a doped material the charge-carrier density and mobility determine the charge-carrier transport, placing an effective lower limit on the thermal transport in the absence of a phonon contribution. As described herein, the present disclosure relates to carbon nanotube compositions, and methods of making such compositions, where the phonon contribution to the thermal conductivity of the compositions can be reduced and even completely suppressed.

Figure 1:
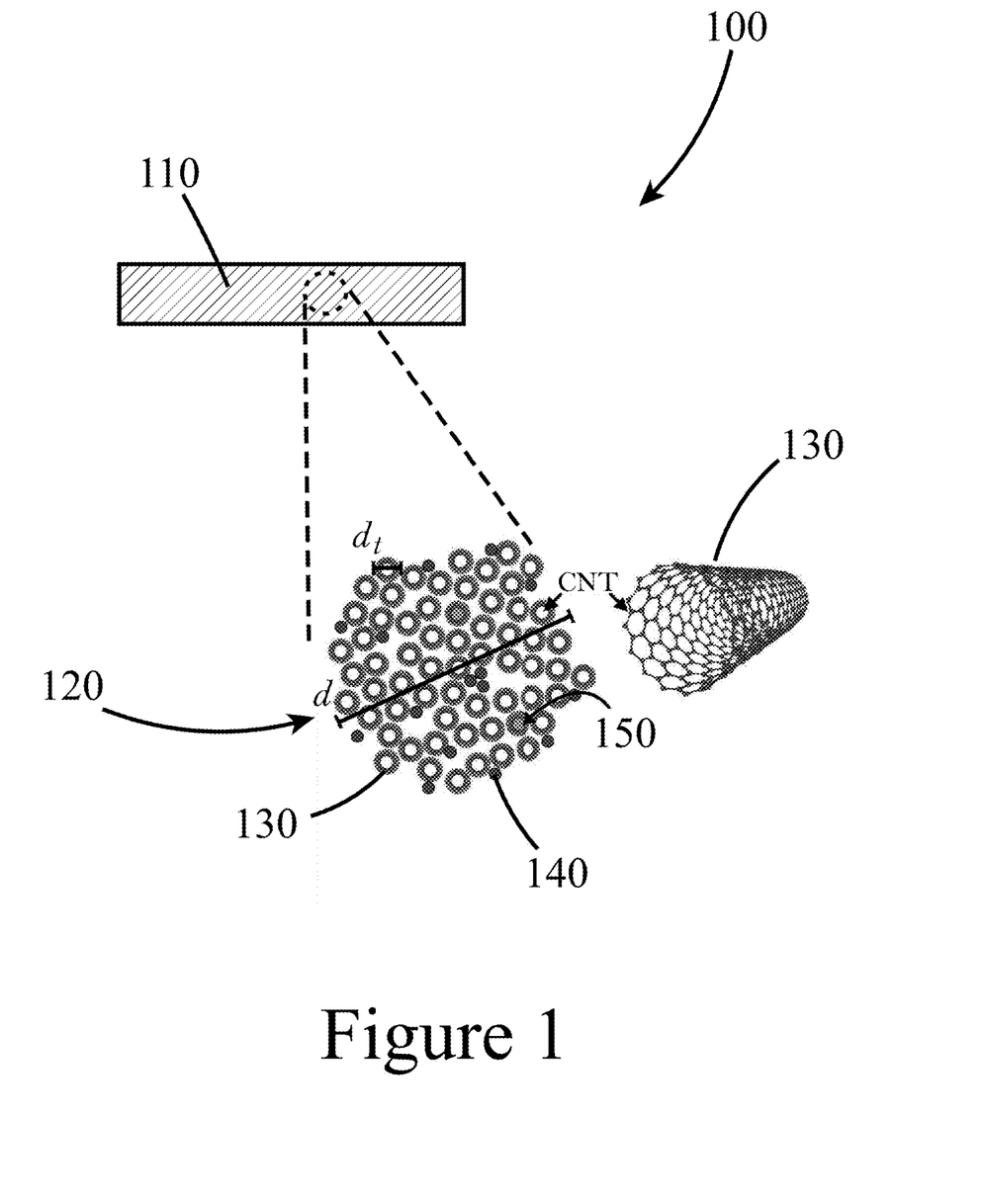
FIG. 1 illustrates a composition constructed of, among other things, a plurality of carbon nanotubes, according to some embodiments of the present disclosure.

FIG. 1 illustrates a composition 100, according to some embodiments of the present disclosure. In this example, the composition 100 is in the form of a film 110, although other forms fall within the scope of the present disclosure. As described herein, a film 110 may include a network of randomly aligned carbon nanotubes 130. FIG. 1 appears to illustrate all of the carbon nanotubes aligned in a parallel orientation orthogonal to the page. This is for simplicity and illustrative purposes only. In an actual film of carbon nanotubes, the carbon nanotubes may be randomly aligned or may form randomly aligned bundles where the individual carbon nanotubes within a bundle are aligned. In some embodiments of the present disclosure, a carbon nanotube 130 may have an average diameter between about 0.6 nm and about 2.0 nm. The carbon nanotubes 130 may organized to form bundles 120 of carbon nanotubes having an average diameter between about 3 nm and about 50 nm. As described in more detail below, the composition may also include at least one of a dopant 140 and/or a solvent 150 resulting in compositions characterized by, among other things, a power factor $\alpha^2\sigma$ between 1 $\mu W/mK^2$ and about 3500 $\mu W/mK^2$ over a temperature range between about 100 K and about 500 K and/or ZT (ZT=$\alpha^2\sigma T/k$: dimensionless) between about 0.02 and about 2.0 over the same temperature range, where a is the Seebeck coefficient, a is the electrical conductivity, k is the thermal conductivity, and T is temperature.

In some embodiments of the present disclosure, the carbon nanotubes 130 may be synthesized by a method that includes at least one of a high-pressure disproportionation of carbon monoxide (HiPCO) method, a catalytic chemical vapor deposition method using a cobalt-molybdenum catalyst (CoMoCAT) method, a plasma torch (PT) method, an arc discharge (AD) method, a laser vaporization (LV) method, and/or any other suitable synthesis method. The resulting carbon nanotubes may include at least one of a single-walled carbon nanotube and/or a double-walled carbon nanotube.

Referring again to FIG. 1, a composition 100 may further include a dopant 140 of at least one of a strongly reducing molecule and/or a strongly oxidizing molecule. In some embodiments of the present disclosure, a dopant 140 may include at least one of $Cl_6Sb$, $F_4$-TCNQ, and/or a dodecaborane cluster. A composition 100 may further include a solvent 150. In some embodiments of the present disclosure, a solvent 150 may include at least one of an alkane, an aromatic, a conjugated solvent, and/or a halogenated hydrocarbon. Examples of alkanes suitable as solvents 150 include at least one of hexane, dodecane, hexadecane, and/or cis-decalin. Examples of aromatic and/or conjugated solvents 150 comprises at least one of toluene, chlorobenzene, and/or 1,2-dichlorobenzene. Examples of halogenated hydrocarbon suitable as solvents 150 include at least one of 1,1-dichloromethane, chloroform, and/1,2-dichloroethane (DCE).

In some embodiments of the present disclosure, at least one of a dopant 140 and/or a solvent 150 may have a freezing point temperature in a range between about 100 K and about 400 K. In some embodiments of the present disclosure, at least a portion of at least one of a solvent 150 and/or a dopant 140 may be positioned within one or more carbon nanotubes 130 (i.e., the endohedral volume–the volume defined by the inside surface of a carbon nanotube's wall). In some embodiments of the present disclosure, a film 110 may have a thickness between about 20 nm and 20 µm, or between about 20 nm and about 100 nm. In some embodiments of the present disclosure, a plurality of carbon nanotubes 130 may be characterized by a density of junctions (not shown) between orthogonally aligned carbon nanotubes 130 or carbon nanotube bundles 120, as measured by atomic force microscopy.

In some embodiments of the present disclosure, a method for synthesizing compositions like that shown in FIG. 1, may be enabled by and/or include submersion of the carbon nanotube film in a mixture (not shown) of the carbon nanotubes 130, the solvent 150, and the dopant 140, where the sonicating enables at least one of the solvent 150 and/or the dopant 140 to access the endohedral volume. In some embodiments of the present disclosure, a method for synthesizing a composition 100 including a plurality of nanotubes 130 may include, before the film submersion step described above, treating the carbon nanotubes with at least one of a solvent (e.g., toluene) and/or a mild acid (e.g., trifluoroacetic acid in toluene), where the treating removes a polymer from a surface of the carbon nanotubes.

Heat transport in nanoscale carbon materials such as carbon nanotubes and graphene is normally dominated by phonons. Shown herein, are measurements of in-plane thermal conductivity, electrical conductivity, and thermopower measured between 77 K and 350 K on two films, each with thickness of less than 100 nm, formed from semiconducting single-walled carbon nanotubes. These measurements were made with silicon-nitride membrane thermal isolation platforms. The two films, formed from disordered networks of tubes with differing tube and bundle size, demonstrated very different thermal conductivities. One film matched a simple model of heat conduction assuming constant phonon velocity and mean free path, and 3D Debye heat capacity with a Debye temperature of 770 K. The second film showed a more complicated temperature dependence, with a dramatic drop in a relatively narrow window near 200 K where phonon contributions to thermal conductivity essentially vanished. This caused a corresponding large increase in the thermoelectric figure-of-merit at the same temperature. A better understanding of this behavior could allow significant improvement in thermoelectric efficiency of these low-cost earth-abundant, organic electronic materials. Also presented herein are heat and charge conductivities near room temperature as a function of doping, which provides further information on the interaction of dopant molecules and phonon transport in the disordered nanotube films.

Thermoelectric energy generation is the conversion of applied heat to useful electricity that occurs in properly engineered electronic materials. Continued improvement in these materials will lead to important applications for power generation and more efficient energy utilization and could play a vital role in meeting our current global energy challenges. The potential of a thermoelectric material is typically assessed using the dimensionless figure-of-merit, $ZT=\alpha^2\sigma T/k$, where $\alpha$ is the Seebeck coefficient, $\sigma$ is the electrical conductivity, k is the thermal conductivity, and T is temperature. ZT determines the overall efficiency of thermoelectric energy generation or cooling (via the Onsager reciprocal Peltier effect where current driven through the material generates a thermal gradient) with larger values of ZT resulting in better thermoelectric devices. Current thermoelectric devices are based on materials having ZT value of about 1. If this value could be increased to about 3 or 4, the resulting gains in the efficiency will allow broad application of thermoelectric devices for energy generation and refrigeration. Further, flexible materials could see important uses in mobile and wearable device applications even at much lower ZT. Regardless of the targeted application, the material's physical properties that comprise ZT are usually determined by the same physics and difficult to separately optimize.

Carbon nanomaterials have dramatic and often tunable thermal and electronic properties. These range from some of the highest known thermal conductivities observed for individual single-walled carbon nanotubes (CNTs) or suspended single-layer graphene to the recently observed unconventional superconducting phase of bilayer magic-angle twisted graphene. Despite k reaching in excess of 3000 W/mK in single nanostructures, driven by the large contributions from phonons, carbon nanotube films can introduce a range of phonon scattering mechanisms that strongly reduce thermal conductivity. This allows consideration of such disordered CNT films or mats for thermoelectric energy harvesting applications. This is largely due to realization of theoretically-predicted large Seebeck coefficients and large in-plane electronic conductivity when doped, and due to a dramatic reduction of thermal conductivity. This reduction is caused not only by tube-tube junctions, but also by additional phonon scattering from the molecular counterions which are present to maintain charge neutrality after remote (e.g., charge-transfer) doping of the semiconducting CNT network in ultrasonically-sprayed films, or films deposited by any other suitable method: e.g., airbrush spraying, spin-coating, dip-coating, Gravure printing, slot-dye coating, drop-casting, and/or others. The ability to select a specific size and chirality of a CNT is important to the tunability of the Seebeck coefficient and charge transport, and when cleavable polymers are used in this selection and removed completely from the resulting film, both n-type and p-type materials can be produced with a very high thermoelectric power factor in a range for $\alpha^2\sigma$ of between about 1 µW/mK$^2$ and about 3,500 µW/mK$^2$, or between about 300 µW/mK$^2$ and about 1,000 µW/mK$^2$.

Measurements of k, $\alpha$, and $\sigma$ as a function of temperature in a range between about 77 K and about 350 K were measured for two types of semiconducting CNT films for various levels of doping. These very unique measurements of k for low thermal conductivity films having thicknesses less than 100 nm were enabled by a micromachined suspended Si—N membrane thermal isolation platform optimized for thermoelectric characterization of very low thermal conductance nanoscale samples. Since both k and a were measured on exactly the same sample using these platforms, as shown in Panel (a) of FIG. 2, a very accurate assessment could be made of the predicted electronic thermal conductivity, $k_e$, via the Wiedemann-Franz (WF) law. This shows that one of these films had a near total elimination of phonon contributions to k, and dramatically improved ZT.

Figure 2:
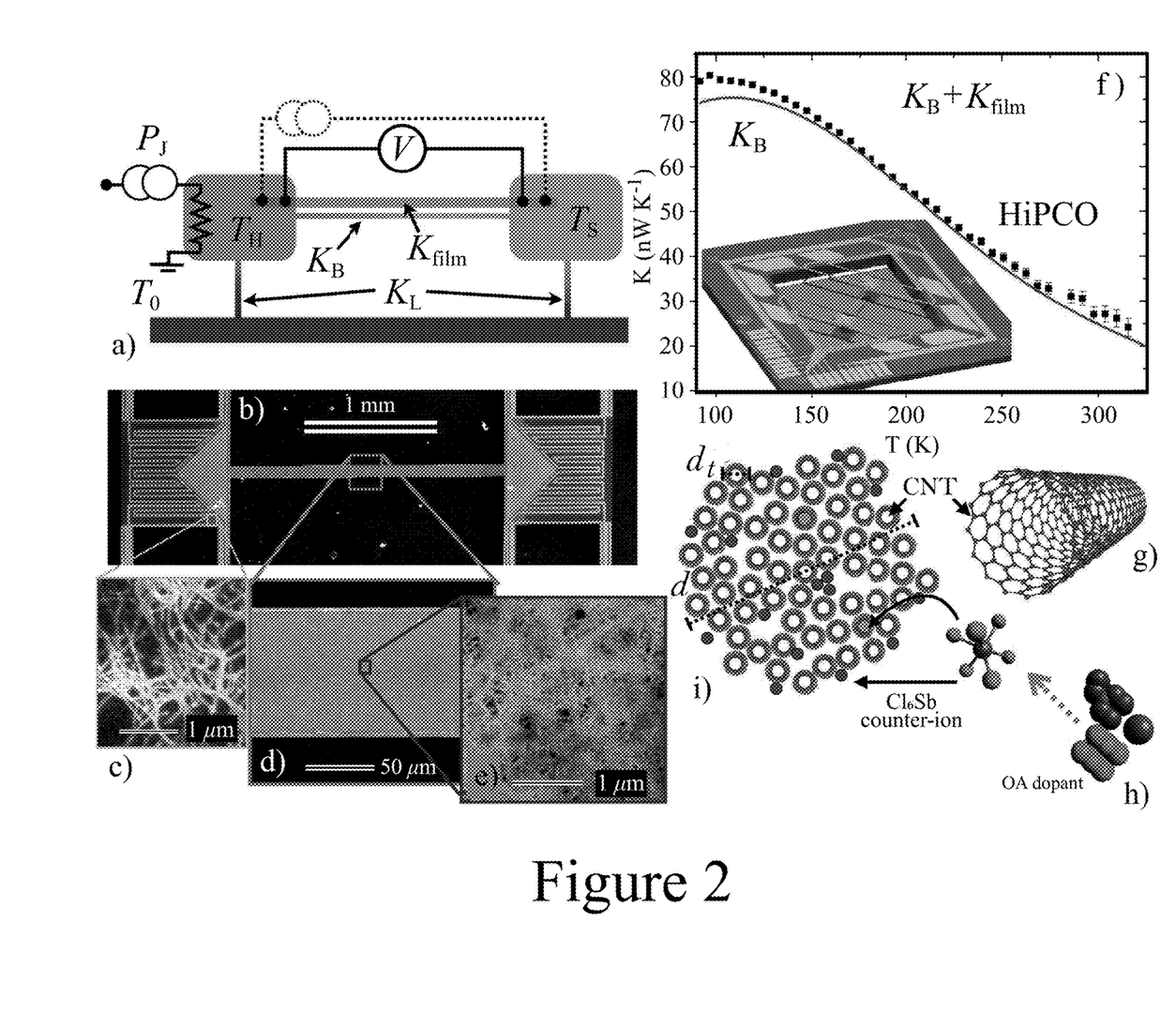

The micromachined thermal isolation platforms used in the work described herein are illustrated with a schematic heat flow model, scanning electron microscope (SEM) micrographs, and example data in FIG. 2. The platforms consisted of two Si—N membrane islands suspended by 4 narrow Si—N legs. These two islands were bridged by a narrow Si—N sample platform. Cr/Pt leads patterned on the Si—N provided resistive thermometers, heaters, leads, and four contacts for charge conductivity and thermopower measurements. Joule heating of one island's heater raised that island to $T_H$ above the base temperature of the cryostat and Si frame supporting the platform, $T_0$. Heat flowed down the sample bridge raising the second island to an intermediate temperature $T_S$. Four-wire measurement of the voltage drop on the heater in response to a known current gave the measured Joule heat, $P_J$. Before a sample was deposited, heat flowed only through the Si—N bridge, and the resulting thermal conductance $K_B$ was determined from the measured $P_J$, $T_H$, and $T_S$ via the expression determined from a simple steady-state model of heat flow in the system shown in Panel (a) of FIG. 2.

$$K_B = \frac{P_J}{2(T_H - T_S)} - \frac{P_J}{2[(T_H - T_0) + (T_S - T_0)]}. \quad (1)$$

In practice, multiple measurements were typically taken to determine $K_B$ from the linear slope of $T_H$ and $T_S$ vs. $P_J$. Deposition of a thin film, in this case by ultrasonic spray deposition using techniques detailed elsewhere, added a parallel heat conductance, $K_{film}$, which can be determined by subtracting the background $K_B$. k is then determined from $K_{film}$ using the film geometry.

Panels (b-e) of FIG. 2 illustrates scanning electron micrographs of an example sprayed CNT film on a thermal platform. The overall Si—N structure of the platform, as well as the lithographically patterned heaters, thermometers and four electrical leads that contact the sample are visible in Panel (b) of FIG. 2. Thermopower measurements use the voltage measured across these leads at each measured $\Delta T$, and a plot of several of these values is linear with a slope that gives the relative Seebeck coefficient $\alpha_{rel} = \Delta V / \Delta T$. This value inherently includes contributions from the Cr/Pt leads as well as the CNT film, though the contribution from the metal is less than about 5 µV/K at all T, such that thermopowers presented here are dominated by the CNT film. Panel (b) of FIG. 2 also indicates two locations where higher magnification shows the density and size of CNT bundles more clearly. Measurement of $K_B + K_{film}$ vs. T for the HiPCO film is compared in Panel (f) of FIG. 2 to the Si—N background $K_B$ (shown as a red line). The low k is apparent from the small shift of the total K. The approximate relative sizes were also compared of: Panel (g) the bundles that form the network of the film, Panel (h) the nanotubes themselves, and Panel (i) of FIG. 2 the OA compound that comprises the triethyloxonium organic molecular dopant cation involved in the charge transfer required to p-dope the CNT tubes and the resulting hexachloroantimonate ($Cl_6Sb$) dopant counter-ion that balances the injected charge. Open questions remain regarding the exact nature of the doping process and the location of the counterions after exposure of the film to the OA compound in DCE solvent. Without wishing to be bound by theory, one hypothesis is that the $Cl_6Sb$ counter-ion remains adsorbed to the tube while the by-products are carried away with removal of the DCE solvent. For simplicity, in Panel (g) of FIG. 2 the size of the complete $Cl_6Sb$ molecule is depicted as distributed through the bundle in sites on the bundle exterior, deeper into the bundle trapped between tubes, and also potentially inside the tubes themselves.

Figure 3:
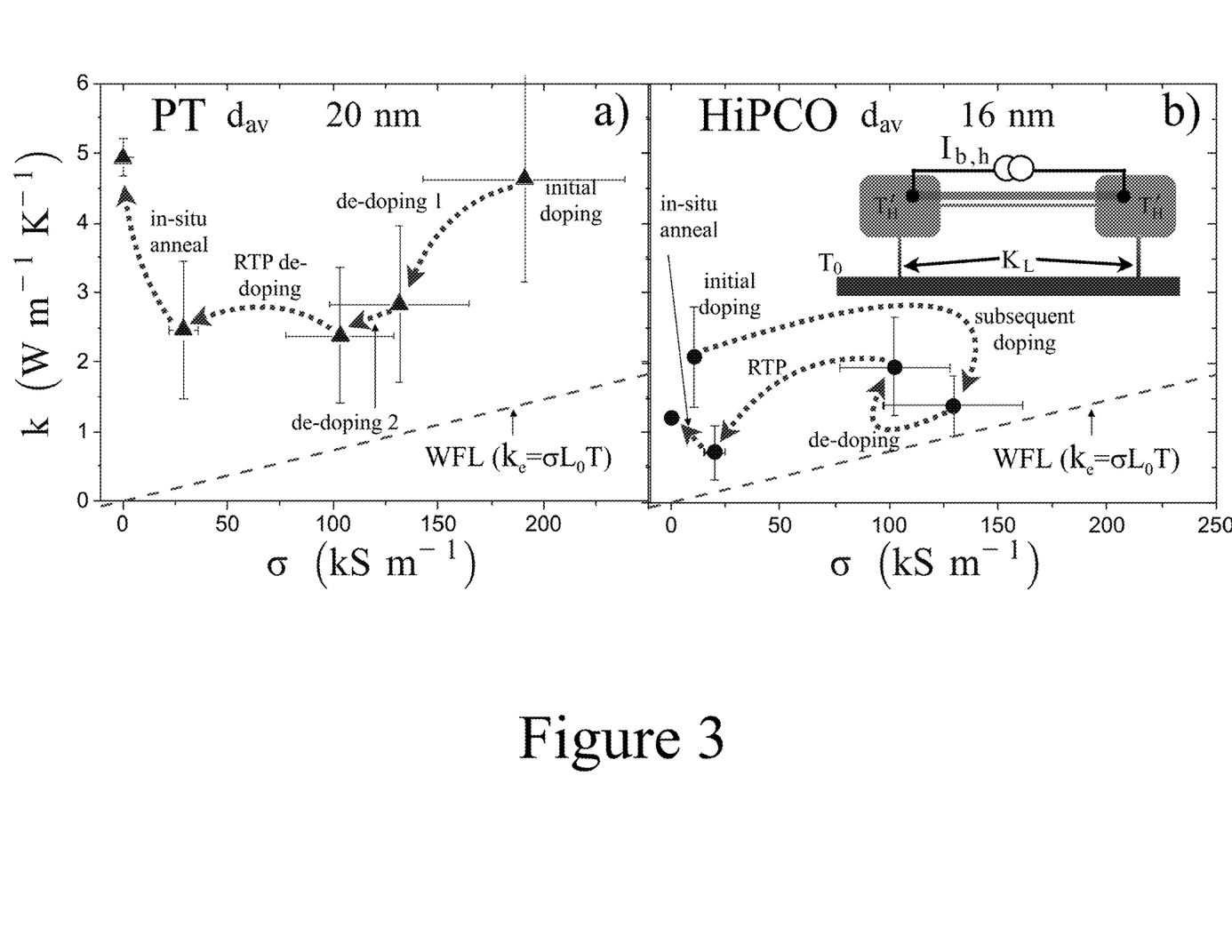
FIG. 3 illustrates near room-temperature k vs. a for the a) PT and b) HiPCO CNT films, according to some embodiments of the present disclosure. These were measured in five different states of doping indicated by the dashed arrows. Electronic contribution $k_e$ predicted by the WF law is shown using the free-electron value of $L=L_0=2.45\times10^{-8}$ W-$\Omega/K^2$. k exceeding this value indicates phonon contributions, and all doping states of these two films show large $k_{ph}$. The inset to b) schematically shows the method used to anneal the films in-situ to achieve the $\sigma=0$ state.

Thermal Conductivity as a Function of Doping: In FIG. 3 near-room temperature values are presented of $k_{tot} = k_e + k_{ph}$ and a for both PT (a) and HiPCO (b) films in five different states of doping. The dashed arrows show the evolution of k and a as dopant was added or removed from the film. Also noted, are the approximate sizes of CNT bundles that form the film in each figure, determined from AFM with the PT tubes forming 20% larger bundles than the HiPCO tubes. The HiPCO tubes also have smaller tube diameter, $d_t = 1 \pm 0.2$ nm, than PT tubes, $d_t = 1.2 \pm 0.3$ nm. The grey line shows the prediction of the WF law, $k_e = \sigma L_0 / T$, with $L_0 = 2.44 \times 10^{-8}$ W$\Omega$/K$^2$ the free-electron value of the Sommerfeld constant. All these near-room T values were higher than the WF predicts, indicating that phonons carry significant heat in these films. The initial doping state (neither film was measured in the undoped state, where earlier measurements suggest a relatively high k with zero a) for both PT and HiPCO films followed similar exposure to OA dopant. This resulted in much higher k and a values for the PT film, with a reaching nearly 200 kS/m. The dopant was then removed from the film in two different steps, first by a short soak in acetone (labeled "de-doping 1") in Panel (a) of FIG. 3, and then by keeping the CNT network in high vacuum for 7 days (labeled "de-doping 2"). At this point the film was stored at room temperature and pressure (RTP) for 412 days. After this long wait, for the PT film, a dropped by more than 70%, indicating de-doping of the CNT network, while k was basically unchanged. This indicates that some population of dopant molecules had either been removed from the film or were present but not causing the charge transfer required to dope the tube network. However, in the latter scenario, the molecules scatter phonons in a similar fashion as when they did cause charge transfer. Note that all doping states for the PT film with finite a roughly follow the trend in k vs. a expected from the WF law, suggesting a picture of charge and heat transport in the doped PT film where a constant $k_{ph}$ is added to $\sigma$-dependent $k_e$.

In contrast, the HiPCO tube network's original doping state was much lower, with $\sigma < 10$ kS/m and k~2 W/mK. In this case, a second exposure to OA was performed, causing additional doping such that a >100 kS/m. This doping, increased a by greater than 10× and dropped k significantly. After this measurement, the HiPCO film was vacuum de-doped for four days and remeasured (labeled "de-doping") in Panel (b) of FIG. 3. This gave a slightly higher k value, though not outside of estimated experimental error, and lower $\sigma$. At this point this film was de-doped at RTP for a period of 423 days. This caused an expected drop in a, but in this case the total k also dropped, to the lowest values measured herein. Thus, for the HiPCO film, all doping states with finite a except the initial doping state roughly match the trend of the WF law, again suggesting that these values could be explained by a constant $k_{ph}$ added to a $\sigma$-dependent $k_e$.

As a final step in the study of the evolution of k with doping, high-temperature in-vacuum annealing was performed by direct heating of the film on the suspended SiN platform. The extreme thermal isolation of the CNT film and its supporting Si—N platform afforded by the micromachined structure allowed the sample to be raised well above room temperature either using the Pt heaters on each platform, or simply by driving current through the film itself. Here the latter method was chosen and a current of between about 200 µA and about 250 µA was applied through the film for several seconds and repeated until the resistance of the CNT network became unmeasurably large. This power dissipation raised the temperature of the platform to a range not exceeding between 500 K and 600 K, which was sufficient to de-dope the film but most likely not large enough to damage the tubes or dramatically change their morphology. Next k was measured in this state for each film, and these data points are indicated with the final arrow labeled "in-situ anneal." Here one can see that both networks regain increased k, suggesting that driving dopant molecules out of the film or electrically de-coupling them from the tubes reduces phonon scattering. However, the larger tube, larger bundle PT network achieved its highest measured k with a value of about 4.9 W/mK, while the HiPCO network, with somewhat smaller tubes and bundles, shows only a slight increase to a k value of about 1.2 W/mK, remaining smaller than the initial measured state of this network with incomplete doping.

This apparently persistent change in k for the HiPCO network could have several possible physical explanations. One could imagine that the heating changed the bundle morphology for these smaller bundles such that the number of tube-tube junctions increased and these were the source of additional phonon scattering and reduced k. However, as the estimated maximum annealing temperatures of about 500 K are likely not large enough to overwhelm the van der Waals forces bundling the tubes, a change in morphology is unlikely. Another possibility is that the chemical process that causes charge transfer from the OA to the tube, which allows doping, introduced some damage or modified geometry to the tube. One could envision that the resulting (hypothetical) local defect could leave a persistent phonon scattering site. In this picture, the return to high k for the PT network after totally de-doping would seem unusual, but the larger bundle size for that film could prevent dopant molecules from reaching the tubes at the core of the bundle, such that when the dopant is driven off, the total k is dominated by the much higher values of these tubes that remained pristine.

Figure 4:
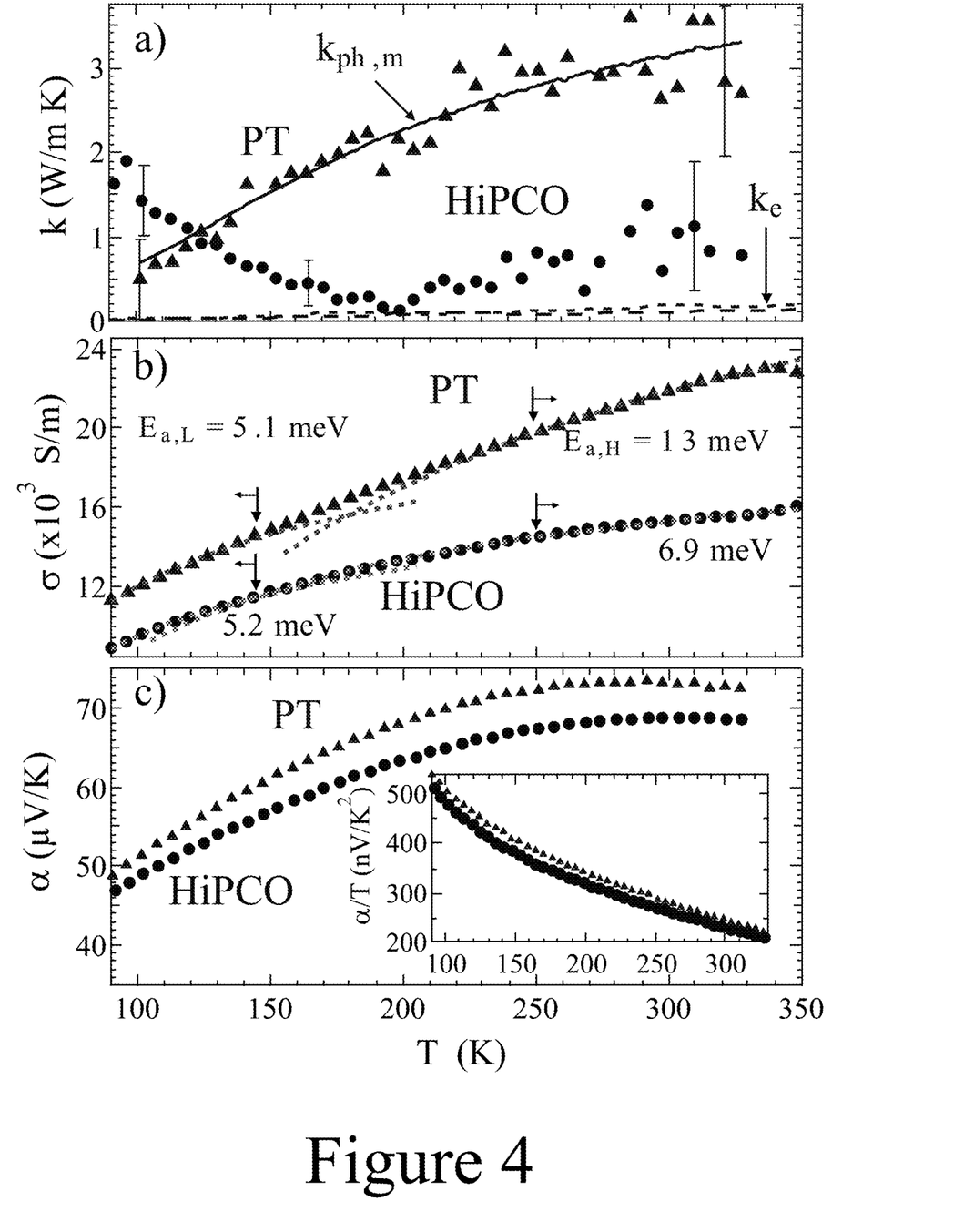
FIG. 4 illustrates a comparison of the T-dependence of a) total thermal conductivity, k, b) charge conductivity, $\sigma$, and c) thermopower, $\alpha$, for films prepared from PT (maroon) and HiPCO (navy) SWCNT films, according to some embodiments of the present disclosure. The solid line in a) is a fit to a simple model of $k_{ph}$ where all T-dependence is driven by changes in $c_{ph}$. Dashed lines in b) are calculated using fit parameters from thermal activation at T ranges above and below the arrows shown. Panel c) Inset: $\alpha/T$ vs. T for both films continually decrease.

Thermal Conductivity and Thermoelectric Properties as a Function of Temperature: In addition to the doping-dependence, the T-dependence of k, a and a for a temperature range between 78 K and 325 K was also investigated, for both films in the RTP de-doped state. These longer data runs in FIG. 4 were performed after the shorter runs near room temperature to determine the values shown in FIG. 3. Panel (a) of FIG. 4 compares total measured k vs. T for PT (triangles) and HiPCO (circles) films, which show a striking difference in the overall dependence on T. The dashed lines at the bottom of the plot show the prediction of the WF law, $k_{el}=\sigma L_o T$, based on the measured a shown in Panel (b) of FIG. 4. For the PT film, measured $k \gg k_{el}$ for the entire measured T range, indicating that phonons dominate k for this film. The trend with T is monotonically increasing and proportional to the dependence of the heat capacity C. Therefore, the kinetic theory expression for thermal conductivity, $k=⅓Cυl$, with $υ$ the average phonon velocity (speed of sound) and the variable l equal to the phonon mean free path, suggests that in this T regime, both $υ$ and l are approximately constant. The solid line labeled $k_{ph,m}$ is a fit of k for the PT film to the expression:

$$k_{ph,m}(T) = A\left(\frac{T}{\theta}\right)^3 \int_0^{\theta/T} \frac{x^4 e^x}{(e^x-1)^2} dx, \quad (2)$$

where $\theta$ is the Debye temperature, $A=3Nυ/k_b$, and the magnitude of the dimensionless integral at each value of $x=\theta/T$ is calculated numerically and used as a function in the fitting. This model cannot separately identify N, $υ$, or $\theta$, suggesting only that these are constant with T for this particular CNT network. The model does indicate a value for $\theta$ of about 770 K. This is in line with expectations of high Debye temperatures similar to diamond and graphite, though the match to the 3D form for specific heat indicates that this disordered CNT network does not act as a lower dimensional system as is the case for single CNTs in certain regimes.

k versus T for the HiPCO CNT network is, in contrast, non-monotonic with increasing T, with an initial drop as T rises from 100 K to about 200 K, where the total measured thermal conductivity at 200 K is equal to the estimated electronic thermal conductivity. k then increases with T, though remains significantly lower than what was observed for the PT tubes. The total k for this CNT network is very low across the entire measured range of T, but the T-dependent elimination of phonon k is unprecedented for carbon nanosystems. Again, simple consideration of the kinetic expression $k_{ph}=⅓C_{ph}υl$ indicates three potential sources for this drop in k. Again, not wishing to be bound by theory, the first would be a T-dependent reduction of phonon modes causing a sharp drop in $c_{ph}$. As the Debye temperature for modes that could contribute to thermal transport should be much larger than 200 K, this origin seems unlikely. The high Debye temperature also argues against a T-dependent change in the related phonon velocity. The most likely cause may be a T-dependent phonon scattering mechanism. This could originate in a tube-tube interaction or tube-dopant interaction that develops this unusual T dependence due to thermal expansion of the CNT network, for example. Similarly, a soft inter-tube vibrational mode not capable of carrying heat could be thermally activated and scatter longer wavelength or higher velocity phonons traveling on the tubes. It is also possible that solvent filling the interior of the tubes could introduce such a dramatic temperature dependence, as solvents such as the dichloroethane (DCE) used to disperse the OA dopant have freezing temperatures near the 200 K inflection point in k. Endohedral solvent filling can dramatically affect thermal conductivity and these changes and related phase transitions are strongly tube-diameter dependent, which could explain the dramatic difference between the PT and HiPCO networks. This difference could also be indirect evidence that the HiPCO process results in a higher number of open-ended nanotubes than the PT process.

FIG. 4 also compares a and a as a function of T for the same CNT films in panels (b) and c), respectively. Both films can be fit to thermal activation over smaller temperature range at high or low temperature, as previously seen. Fits of this type to the expression:

$$\sigma_L = \sigma_{o,L}\exp\left(\frac{-E_{a,L}}{k_b T}\right), \sigma_H = \sigma_{o,H}\exp\left(\frac{-E_{a,H}}{k_b T}\right) \quad (3)$$

are shown in Panel (b) of FIG. 4, as dashed lines, with the resulting activation energies given in the figure. The PT film has a large separation of $E_{a,L}$ and $E_{a,H}$. The HiPCO film has a smaller separation, though still does not allow a good fit using a single activation energy.

The T-dependence of a demonstrates a non-linear behavior across the entire range from 80-330 K. Since the thermopower is typically assumed to be dominated by the ballistic term, this suggests a temperature-dependent energy derivative of the density of states. The clearest indication of the phonon drag contribution is a peak easily resolved by plotting either $d\alpha/dT$ or, as we show in the inset to Panel (c) of FIG. 4, $\alpha/T$ vs. T. For both films, this plot decreases sharply at the bottom of our measured T range, leveling off at higher T.

Figure 5:
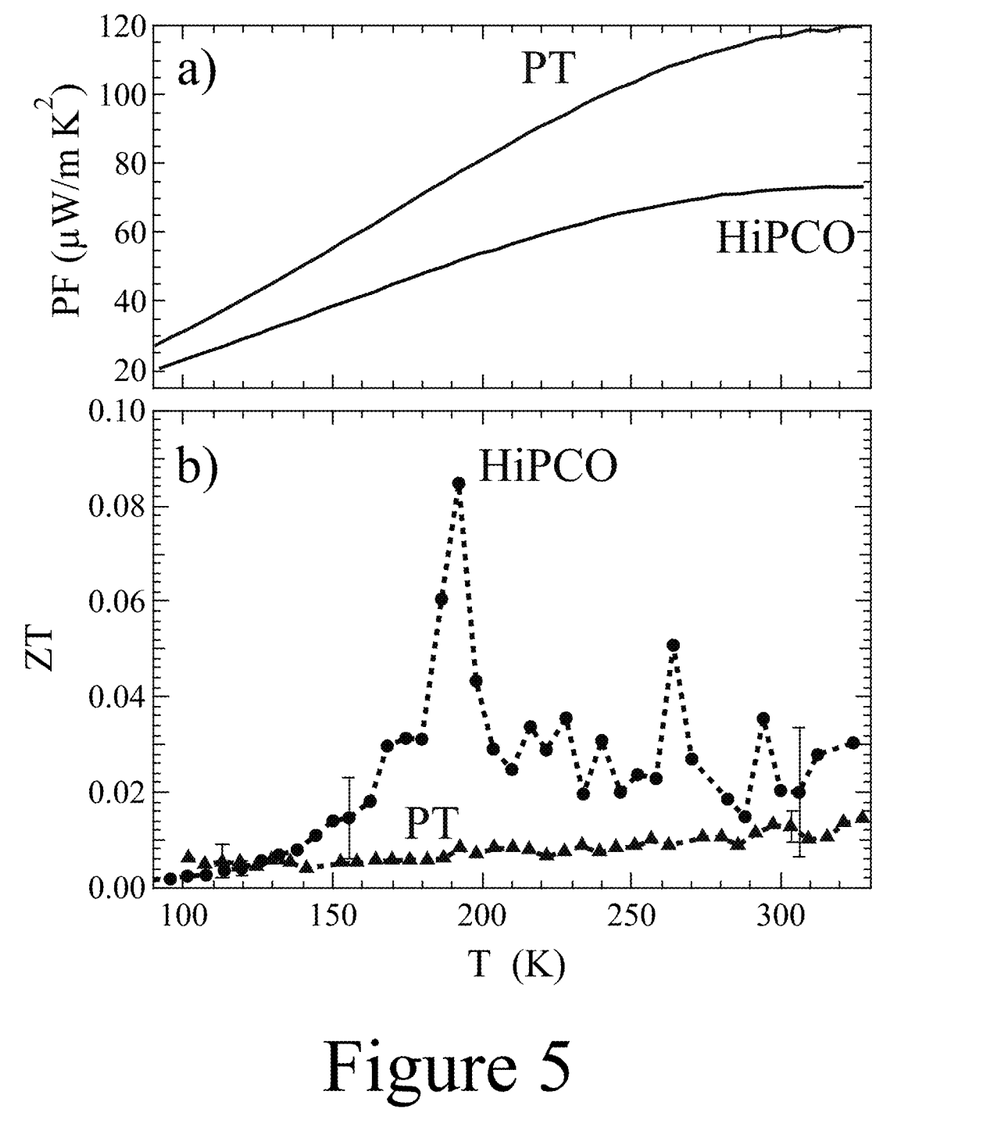
FIG. 5 illustrates a) thermoelectric power factor vs. T for PT and HiPCO films in the RTP de-doped state, and b) ZT vs. T for PT and HiPCO films in the same doping state, according to some embodiments of the present disclosure. The elimination of $k_{ph}$ near 200 K drives a >4-fold increase in ZT near this temperature. The HiPCO film maintains higher ZT at all T due to its low k.

Finally, the thermoelectric properties resulting from these T-dependent measurements are presented in FIG. 5. The power factor (PF=$\alpha^2\sigma$) is compared for the two films in Panel (a) of FIG. 5. The PT film in the 130 kS/m doping state reached PF=190 µW/mK$^2$. The HiPCO network's lower $\alpha$ and $\sigma$ obviously drive a lower PF, which is ≈30% lower than for the PT network just below 200 K, and ≈50% lower near 300 K. Despite this lower PF, Panel (b) of FIG. 5 shows large ZT for the HiPCO film, due to its smaller k at all T. Most striking is the peak in ZT near 200 K, where the phonon k was essentially eliminated as seen in Panel (a) of FIG. 4. This value reaches over ZT=0.08, which approaches the current record value for such materials.

Experimental

Carbon Nanotube Thin Film Preparation: The two films described herein were prepared using a cleavable polymer for separation of the semiconducting single-walled CNTs from two different raw soots: the first prepared using the plasma torch method (PT) purchased from NanoIntegris (RN-020), and the second prepared using high pressure disproportionation of carbon monoxide (HiPCO). The raw soot was sonicated with the fluorene-based polymer solution, allowing the polymer to selectively wrap and individualize semiconducting tubes. Subsequent ultracentrifugation allowed removal of tubes with unwanted electronic properties. The enriched semiconducting tubes were ultrasonically sprayed, and the cleavable polymer was completely removed in the solid-state film, generating a 68±15 nm thick HiPCO film and a 60±15 nm thick PT film.

Thermal Isolation Platform Fabrication and Measurements: Thermal isolation platforms were formed on 4" Silicon wafers coated with 500 nm thick amorphous silicon-nitride (Si—N). After deposition and patterning of Cr/Pt thin film leads, heaters, and thermometers and formation of windows in the Si—N via dry-etching, free standing Si—N structures were formed by removal of bulk Si with TMAH wet-etching. Sample films were selectively applied to the Si—N bridge linking the two instrumented islands using a shadow mask. Background thermal conductance was measured either before sample deposition or on a witness thermal platform fabricated on the same wafer. Measurements were performed with the Si frame of the platform clamped to a radiation-shielded gold-coated copper sample mount bolted to a liquid nitrogen sample-in-vacuum cryostat.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a film comprising a network of randomly aligned single-walled carbon nanotubes (SWCNTs) and a solvent, wherein:
   the SWCNTs have an endohedral volume,
   at least a portion of the solvent is positioned within the endohedral volume,
   the SWCNTs have an average diameter between 0.8 nm and 1.25 nm,
   the SWCNTs are essentially free of a polymer,
   the composition is characterized by a power factor $\alpha^2\sigma$ between 20 µW/mK$^2$ and about 60 µW/mK$^2$ over a temperature range between about 100 K and about 360 K,
   the composition is characterized by ZT=$\alpha^2\sigma$T/k between about 0.002 and about 0.088 over the temperature range, and
   where $\alpha$ is the Seebeck coefficient, $\sigma$ is the electrical conductivity, k is the thermal conductivity, and T is temperature.

2. The composition of claim 1, wherein the film has a thickness between about 20 nm and 200 m.

3. The composition of claim 1, further comprising a density of junctions between orthogonally aligned carbon nanotubes or carbon nanotube bundles, as measured by atomic force microscopy.

4. The composition of claim 1, the SWCNTs further comprise a dopant comprising a strongly reducing molecule or a strongly oxidizing molecule.

5. The composition of claim 4, wherein the dopant comprises at least one of Cl$_6$Sb, F$_4$-TCNQ, or a dodecaborane cluster.

6. The composition of claim 5, wherein at least one of the dopant or the solvent has a freezing point temperature in a temperature range between about 100 K and about 400 K.

7. The composition of claim 1, wherein the solvent comprises at least one of an alkane, an aromatic, a conjugated solvent, or a halogenated hydrocarbon.

8. The composition of claim 7, wherein the alkane comprises at least one of hexane, dodecane, hexadecane, or cis-decalin.

9. The composition of claim 7, wherein the at least one aromatic or conjugated solvent comprises at least one of toluene, chlorobenzene, or 1,2-dichlorobenzene.

10. The composition of claim 7, wherein the halogenated hydrocarbon comprises at least one of 1,1-dichloromethane, chloroform, or 1,2-dichloroethane.

11. A method comprising:
   synthesizing single wall carbon nanotubes (SWCNTs) by a high-pressure disproportionation of carbon monoxide method;
   separating the SWCNTs from a raw soot using a polymer;
   treating the SWCNTs with at least one of a solvent or a mild acid;
   immersing the SWCNTs in a mixture of a solvent and a dopant; and
   depositing the SWNTs to form a film of randomly aligned SWCNTs, wherein:
   the treating removes the polymer from a surface of the carbon nanotubes,
   the SWCNTs have an endohedral volume,
   the solvent is positioned within the endohedral volume, the SWCNTs have an average diameter between 0.8 nm and 1.25 nm, the SWCNTs are essentially free of the polymer, the composition is characterized by a power factor $\alpha^2\sigma$ between 20 $\mu W/mK^2$ and about 60 $\mu W/mK^2$ over a temperature range between about 100 K and about 360 K, the composition is characterized by $ZT=\alpha^2\sigma T/k$ between about 0.002 and about 0.088 over the temperature range, and where $\alpha$ is the Seebeck coefficient, $\sigma$ is the electrical conductivity, k is the thermal conductivity, and T is temperature.

* * * * *